(12) United States Patent
Kim et al.

(10) Patent No.: US 12,384,271 B2
(45) Date of Patent: Aug. 12, 2025

(54) BATTERY PERFORMANCE MANAGEMENT SYSTEM AND METHOD

(71) Applicant: LG Energy Solution, Ltd., Seoul (KR)

(72) Inventors: Dong-Myung Kim, Daejeon (KR); Hyung-Sik Kim, Daejeon (KR); Hyoung Jun Ahn, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 492 days.

(21) Appl. No.: 17/641,148

(22) PCT Filed: Mar. 24, 2021

(86) PCT No.: PCT/KR2021/003673
§ 371 (c)(1),
(2) Date: Mar. 8, 2022

(87) PCT Pub. No.: WO2021/194267
PCT Pub. Date: Sep. 30, 2021

(65) Prior Publication Data
US 2022/0281345 A1    Sep. 8, 2022

(30) Foreign Application Priority Data

Mar. 24, 2020 (KR) .................. 10-2020-0035892
Mar. 23, 2021 (KR) .................. 10-2021-0037625

(51) Int. Cl.
*B60L 53/68* (2019.01)
*B60L 53/30* (2019.01)
(Continued)

(52) U.S. Cl.
CPC ............. *B60L 53/68* (2019.02); *B60L 53/305* (2019.02); *B60L 53/65* (2019.02); *B60L 53/66* (2019.02); *G01R 31/392* (2019.01)

(58) Field of Classification Search
CPC ....................................................... B60L 53/68
(Continued)

(56) References Cited

U.S. PATENT DOCUMENTS

2011/0082621 A1* 4/2011 Berkobin ............... B60L 58/16
701/31.4
2012/0259665 A1* 10/2012 Pandhi ............... G07F 17/0057
705/4

(Continued)

FOREIGN PATENT DOCUMENTS

CN    104459552 A    3/2015
CN    105717457 A    6/2016
(Continued)

OTHER PUBLICATIONS

International Search Report for PCTKR2021003673 dated Jul. 16, 2021, 2 pgs.
(Continued)

*Primary Examiner* — Jerry D Robbins
(74) *Attorney, Agent, or Firm* — Lerner David LLP

(57) ABSTRACT

A battery performance management system and method using an electric vehicle charging station. The battery performance management server collects battery performance evaluation information including identification information and operation characteristic accumulative information of a battery, identification information and driving characteristic accumulative information of the electric vehicle, and latest charging characteristic information of the battery from a plurality of charging stations through a network. The server determines a current state of health (SOH) corresponding to the collected battery performance evaluation information by using an artificial intelligence model that is trained in advance to receive the battery performance evaluation information and output a SOH of the battery. The server determines a latest control factor corresponding to the current
(Continued)

SOH, and transmits the latest control factor to the charging station so that the charging station may transmit the latest control factor to a control system of the electric vehicle to update the control factor.

19 Claims, 8 Drawing Sheets

(51) Int. Cl.
  *B60L 53/65* (2019.01)
  *B60L 53/66* (2019.01)
  *G01R 31/392* (2019.01)
(58) Field of Classification Search
  USPC .......................................................... 320/109
  See application file for complete search history.

(56) References Cited

U.S. PATENT DOCUMENTS

| | | | | |
|---|---|---|---|---|
| 2013/0085696 | A1* | 4/2013 | Xu | B60L 58/16 |
| | | | | 702/63 |
| 2014/0111164 | A1* | 4/2014 | Ohkawa | H02J 7/04 |
| | | | | 320/134 |
| 2014/0201090 | A1* | 7/2014 | Liang | B60L 58/21 |
| | | | | 324/426 |
| 2015/0362559 | A1* | 12/2015 | Hametner | G01R 31/3828 |
| | | | | 702/63 |
| 2017/0131360 | A1* | 5/2017 | Kawahara | G01R 31/3648 |
| 2018/0009323 | A1 | 1/2018 | Liang | |
| 2019/0392320 | A1* | 12/2019 | Kim | B60L 58/12 |
| 2020/0326381 | A1 | 10/2020 | Matsumura et al. | |
| 2021/0004879 | A1* | 1/2021 | Nakajima | G06Q 30/0283 |
| 2021/0091583 | A1 | 3/2021 | Kamijima | |
| 2021/0181256 | A1 | 6/2021 | Kawamura et al. | |
| 2021/0190878 | A1 | 6/2021 | Lee et al. | |
| 2021/0203177 | A1* | 7/2021 | Peng | B60L 53/63 |
| 2021/0300272 | A1 | 9/2021 | Nishida | |
| 2022/0276688 | A1* | 9/2022 | Fujita | G06Q 30/0645 |
| 2023/0009714 | A1* | 1/2023 | Jeong | B60L 58/10 |
| 2023/0305068 | A1* | 9/2023 | Onoue | H02J 7/00032 |
| 2024/0013313 | A1* | 1/2024 | Iida | B60L 58/14 |

FOREIGN PATENT DOCUMENTS

| | | | |
|---|---|---|---|
| JP | 2003288539 | A | 10/2003 |
| JP | 2005227141 | A | 8/2005 |
| JP | 2006221310 | A | 8/2006 |
| JP | 2010107439 | A | 5/2010 |
| JP | 2013516614 | A | 5/2013 |
| JP | 2014209359 | A | 11/2014 |
| JP | 2015015827 | A | 1/2015 |
| JP | 2020009617 | A | 1/2020 |
| KR | 20130082959 | A | 7/2013 |
| KR | 20140058864 | A | 5/2014 |
| KR | 20150055649 | A | 5/2015 |
| KR | 20160000317 | A | 1/2016 |
| KR | 101873845 | B1 | 7/2018 |
| KR | 101968551 | B1 | 4/2019 |
| KR | 20190100114 | A | 8/2019 |
| KR | 20200011828 | A | 2/2020 |
| KR | 20200030467 | A | 3/2020 |
| KR | 102155333 | B1 | 9/2020 |
| WO | 2019131824 | A1 | 7/2019 |
| WO | 2019181628 | A1 | 9/2019 |
| WO | 2019235645 | A1 | 12/2019 |
| WO | 2020027203 | A1 | 2/2020 |
| WO | 2020045033 | A1 | 3/2020 |

OTHER PUBLICATIONS

Extended European Search Report including Written Opinion for Application No. 21776702.9 dated Dec. 13, 2022, pp. 1-8.
Extended European Search Report including Written Opinion for Application No. 24190203.0 dated 102/24/24. 13 pgs.
Communication pursuant to Article 94(3) EPC for European Application No. 24190203.0, dated Apr. 3, 2025, 8 pages.
Japanese Office Action for Application No. 2024-075600 dated Apr. 22, 2025, 3 pages.

* cited by examiner

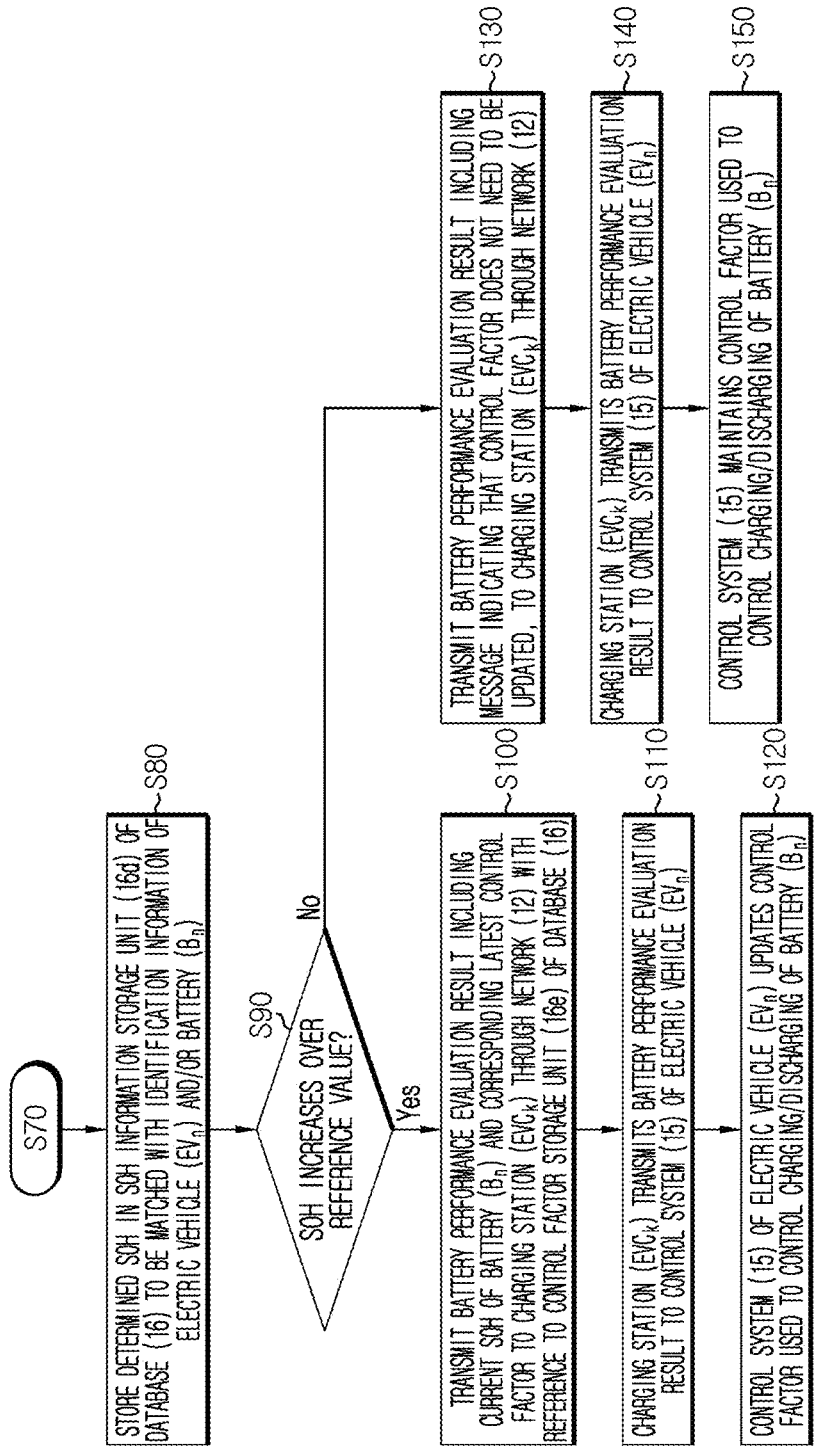

BATTERY PERFORMANCE MANAGEMENT SYSTEM AND METHOD

CROSS-REFERENCE TO RELATED APPLICATIONS

The present application is a national phase entry under 35 U.S.C. § 371 of International Application No. PCT/KR2021/003673 filed Mar. 24, 2021, published in Korean, which claims priority from Korean Patent Application No. 10-2020-0035892 filed on Mar. 24, 2020 and Korean Patent Application No. 10-2021-0037625 filed on Mar. 23, 2021, all of which are incorporated herein by reference.

TECHNICAL FIELD

The present disclosure relates to a battery performance management system and method, and more particularly, a system in which while an electric vehicle is being charged at an electric vehicle charging station, a remote server may collect battery performance evaluation information and store in a database, determine a SOH (State Of Health) of a battery by using an artificial intelligence model trained using big data, and update a control factor used for controlling charging/discharging of the battery, and a method thereof.

BACKGROUND ART

The use of batteries is rapidly spreading not only to mobile devices such as cell phones, laptop computers, smart phones and smart pads, but also to electric vehicles (EV), hybrid electric vehicles (HEV), plug-in hybrid vehicles (PHEV) and large-capacity energy storage systems (ESS).

In case of a battery of an electric vehicle, the speed of performance degradation changes depending on driving habits of a driver or driving environments. For example, if the electric vehicle is used with frequent rapid acceleration or operated in a mountainous area, a desert area or a cold area, the battery of the electric vehicle has a relatively fast degradation speed.

The degradation of battery performance may be quantified as a factor called SOH (State Of Health). The SOH is a numerical value indicating the performance of a battery in a MOL (Middle Of Life) state as a relative ratio based on the performance of the battery in a BOL (Beginning Of Life) state.

As indicators representing battery performance, capacity and internal resistance of the battery are used. As the charging/discharging cycle of the battery increases, the capacity of the battery decreases and the internal resistance increases. Therefore, the SOH may be quantified by the rate of decrease in capacity of the battery or the rate of increase in internal resistance of the battery.

The SOH of the battery in a BOL state is expressed as 100%, and the SOH of the battery in a MOL state is expressed as a percentage lower than 100%. If the SOH is lowered below a certain level, the performance of the battery has degraded beyond the limit, so the battery needs to be replaced.

The charging/discharging control logic of the battery must be set differently according to the degradation state of the performance to delay the degradation speed of the battery as much as possible and thus extend the service life. To this end, there is a need for a method to monitor performance changes for a plurality of batteries of the same model in a centralized manner and to efficiently update various control logics used for charging and discharging the batteries of electric vehicles.

SUMMARY

Technical Problem

The present disclosure is designed to solve the problems of the related art, and therefore the present disclosure is directed to providing a battery performance management system and method, which may accumulatively collect battery performance evaluation information from a charging station while an electric vehicle is being charged at the electric vehicle charging station, diagnose the performance (e.g., SOH) of the battery based on the collected big data, and update control factors used for controlling charging/discharging of the battery according to the diagnosed performance in a platform-based manner.

Technical Solution

In one aspect of the present disclosure, there is provided a battery performance management system using an electric vehicle charging station, comprising: a battery performance management server communicatively connected through a network to a plurality of charging stations; and a database connected to the battery performance management server and configured to store SOH information of electric vehicles.

Preferably, for an electric vehicle at a given charging station of the plurality of charging stations, the battery performance management server is configured to: collect, from the given charging station through the network, battery performance evaluation information of the electric vehicle, the battery performance evaluation information of the electric vehicle including: identification information and operation characteristic accumulative information of a battery of the electric vehicle, identification information and driving characteristic accumulative information of the electric vehicle, and most recent charging characteristic information of the battery; store the battery performance evaluation information of the electric vehicle in the database; determine a current SOH of the battery corresponding to the collected battery performance evaluation information based on an artificial intelligence model that is trained at least in part using battery performance evaluation information of other vehicles, in response to the current SOH increasing by less than a reference value compared to a previous SOH, use a most recent control factor for controlling battery operation, the most recent control factor corresponding to the current SOH based on prestored correlation information in the database, and transmit the most recent control factor to a control system of the electric vehicle through the given charging station.

According to an aspect, the operation characteristic accumulative information of the battery may include at least one selected from the group consisting of accumulative operation time at each voltage section, accumulative operation time at each current section, and accumulative operation time at each temperature section.

According to another aspect, the driving characteristic accumulative information of the electric vehicle may include at least one selected from the group consisting of accumulative driving time at each speed section, accumulative driving time at each driving area, and accumulative driving time at each humidity section.

According to still another aspect, the most recent charging characteristic information may include at least one selected from the group consisting of SOC, voltage, current and temperature data of the battery measured or estimated at a plurality of time points.

Preferably, the battery performance management server is configured to, in response to the battery performance evaluation information being received from the plurality of electric vehicle charging stations and the most recent charging characteristic information includes data sufficient to determine the current SOH of the battery: determine the current SOH of the battery from the most recent charging characteristic information; store the operation characteristic accumulative information of the battery, the driving characteristic accumulative information of the electric vehicle and the latest charging characteristic information in the database as training input data of the artificial intelligence model; and store the current SOH of the battery in the database as training output data of the artificial intelligence model.

Preferably, the battery performance management server may be configured to repeatedly train the artificial intelligence model in response to an amount of training input data and training output data stored in the database exceeding a storage reference value.

According to an aspect, the battery performance management server may be configured to store the training input data and the training output data in the database to be matched with at least one of the identification information of the battery, the identification information of the electric vehicle, or a driving area of the electric vehicle; and repeatedly train the artificial intelligence model to correspond to the at least one of the identification information of the battery, the identification information of the electric vehicle or the driving area of the electric vehicle in response to an amount of the stored training input data and training output data exceeding a storage reference value.

According to another aspect, the battery performance management server may be configured to determine the current SOH of the battery basis on an analysis of the battery performance evaluation information using the artificial intelligence model.

In the present disclosure, the battery performance management server may be configured to receive the SOH information for each cycle of the battery and performance evaluation information of each cycle of the battery, wherein the performance evaluation information of each cycle of the battery includes operation characteristic accumulative information and most recent charging characteristic information measured in response to each charging/discharging cycle of the battery; and store the received SOH information and performance evaluation information of each cycle of the battery in the database.

In this case, the battery performance management server may further include an auxiliary artificial intelligence model trained using the received SOH information stored in the database and configured to output an auxiliary SOH output based on the operation characteristic accumulative information and the most recent charging characteristic information of the battery.

Preferably, in response to the artificial intelligence model not being completely trained, the battery performance management server may be configured to determine the current SOH based on the operation characteristic accumulative information and the most recent charging characteristic information of the battery included in the battery performance evaluation information using the auxiliary artificial intelligence model.

In addition, the battery performance management server may be configured to determine the auxiliary SOH output based on the operation characteristic accumulative information and the most recent charging characteristic information of the battery included in the battery performance evaluation information using the auxiliary artificial intelligence model, and determine the current SOH of the battery based on a weighted average of an SOH output determined by the artificial intelligence model and the auxiliary SOH output determined by the auxiliary artificial intelligence model.

In addition, the battery performance management server may be configured to increase a weight endowed to the SOH output of the artificial intelligence model for calculating the weighted average as an amount of training of the artificial intelligence model increases.

In an embodiment, the artificial intelligence model may be an artificial neural network.

In the present disclosure, the control factor may include: at least one selected from a charging current magnitude applied for each SOC section, a charging upper limit voltage value, a discharging lower limit voltage value, a maximum charging current, a maximum discharging current, a minimum charging current, a minimum discharging current, a maximum temperature, a minimum temperature, a power map of each SOC, and an internal resistance map of each SOC; at least one selected from an upper limit of a pulse current duty ratio (a ratio of a pulse sustain period to a pulse rest period), a lower limit of the pulse current duty ratio, an upper limit of a pulse current duration, a lower limit of the pulse current duration, a maximum value of the pulse current, and a minimum value of the pulse current; or at least one selected from a current magnitude in a constant-current charging (CC) mode, a cutoff voltage at which the constant-current charging (CC) mode ends, and a voltage magnitude in a constant-voltage charging (CV) mode.

In another embodiment of the present disclosure, the battery performance management server may be configured to transmit a driving distance of the electric vehicle, the current SOH and the identification information of the electric vehicle to an insurance company server, and the insurance company server may be configured to calculate an insurance premium for the corresponding electric vehicle with reference to the identification information of the electric vehicle by using the current SOH and the driving distance of the electric vehicle.

In another aspect of the present disclosure, there is also provided a battery performance management method using an electric vehicle charging station, comprising: collecting battery performance evaluation information including identification information and operation characteristic accumulative information of a battery included in an electric vehicle, identification information and driving characteristic accumulative information of the electric vehicle, and most recent charging characteristic information of the battery from a charging station through a network while the electric vehicle is being charged at the charging station; storing the battery performance evaluation information in a database; determining a current SOH corresponding to the collected battery performance evaluation information by using an artificial intelligence model that is trained at least in part using battery performance evaluation information of other vehicles; in response to the current SOH increasing by less than a reference value compared to a previous SOH, using a most recent control factor for controlling battery operation, the most recent control factor corresponding to the current SOH based on prestored correlation information in the database; and transmitting the most recent control factor to a control system of the electric vehicle through the charging station.

The technical object may also be accomplished by a computer device. The computer device may comprise: a non-transitory memory device configured to store a plurality of processor executive commands; and a processor configured to execute the plurality of processor executive commands By executing the processor executive commands, the processor may be configured to:

(a) receive battery performance evaluation information including identification information and operation characteristic accumulative information of a battery included in an electric vehicle, identification information and driving characteristic accumulative information of the electric vehicle, and most recent charging characteristic information of the battery from a charging station through a network, (b) train an artificial intelligence model to output an SOH of the battery based on battery performance evaluation information of other vehicles, (c) determine a current SOH of the battery corresponding to the collected battery performance evaluation information using the trained artificial intelligence model, (d) read a previous SOH of the battery from a database, (e) in response to the current SOH increasing by less than a reference value compared to a previous SOH use a most recent control factor for controlling battery operation, the most recent control factor corresponding to the current SOH based on prestored correlation information in the database, and (f) transmit the most recent control factor to the charging station through the network.

Advantageous Effects

According to the present disclosure, since a big data-based artificial intelligence platform system linked with a plurality of charging stations is used to reliably evaluate the performance of the battery according to the driving history of the electric vehicle and the operation history of the battery and optimize the control factor used for controlling the charging/discharging of the battery, it is possible not only to extend the service life of the battery, but also to improve the safety.

By providing a highly reliable battery performance management service to an electric vehicle user, it is possible to induce replacement of the battery at an appropriate time point, as well as improve the reliability of a battery manufacturer.

By building a big data-based database with the battery performance evaluation information reflecting the driving tendency of the electric vehicle user, the database may be used as an accurate insurance premium calculation data for automobile insurance companies.

BRIEF DESCRIPTION OF THE DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIGS. 10 to 11 are flowcharts for illustrating a battery performance management method using the electric vehicle charging station according to an embodiment of the present disclosure.

DETAILED DESCRIPTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
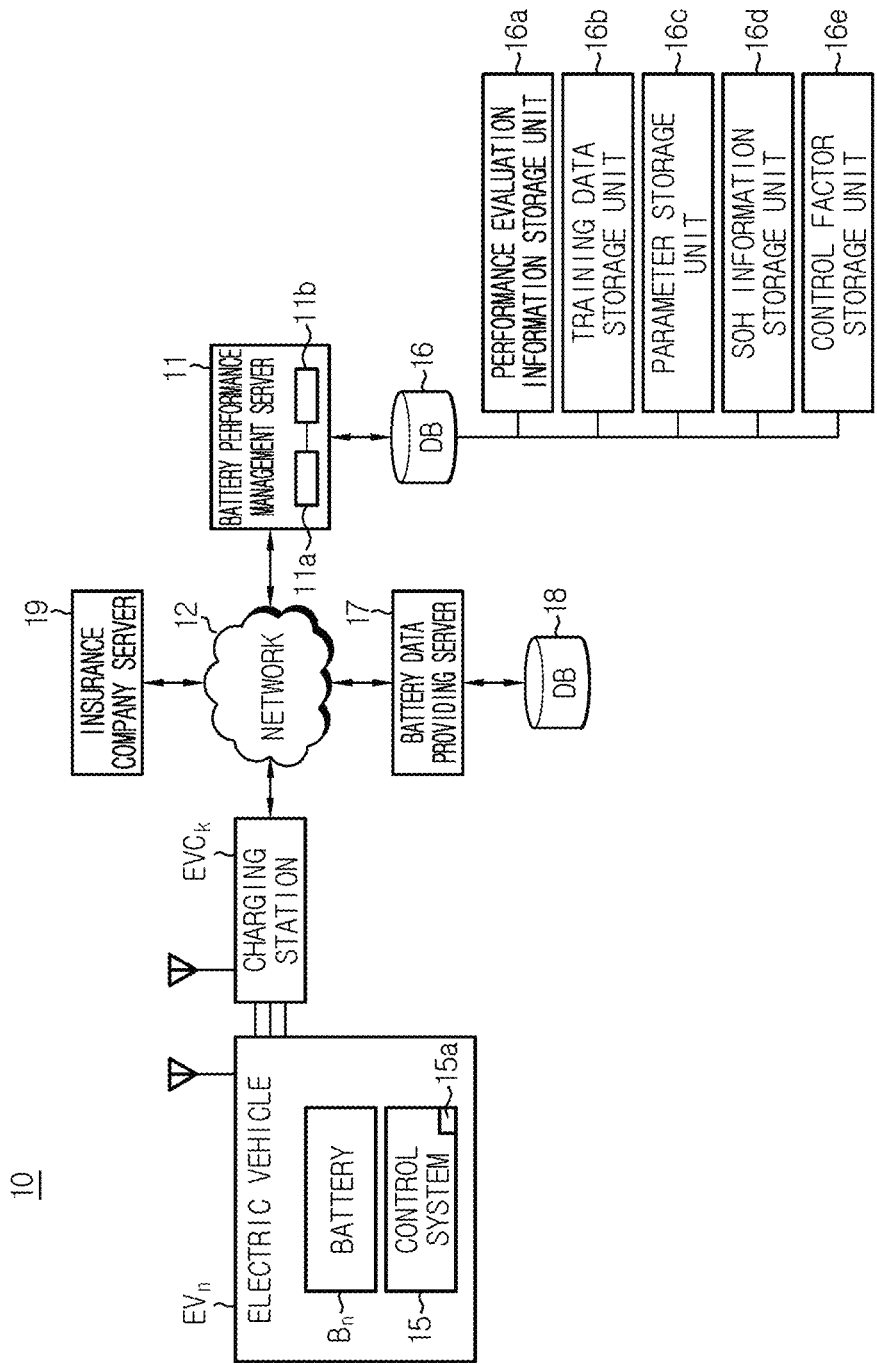
FIG. 1 is a block diagram showing a configuration of a battery performance management system using an electric vehicle charging station according to an embodiment of the present disclosure.

FIG. 1 is a block diagram showing a configuration of a battery performance management system using an electric vehicle charging station according to an embodiment of the present disclosure.

Referring to FIG. 1, a battery performance management system 10 according to an embodiment of the present disclosure includes a plurality of charging stations $EVC_k$ and a battery performance management server 11. k is an index for indicating that an object indicated by a reference sign is a plurality of objects. If the charging stations $EVC_k$ are installed at 10,000 sites, k is 1 to 10,000.

Preferably, the charging station $EVC_k$ and the battery performance management server 11 may be communicatively connected to each other through a network 12.

The network 12 is not limited in its type as long as it supports communication between the charging station $EVC_k$ and the battery performance management server 11.

The network 12 includes a wired network, a wireless network, or a combination thereof. The wired network includes a local area or wide area Internet that supports the TCP/IP protocol. The wireless network includes a wireless communication network based on a base station, a satellite communication network, a local area wireless communication network such as Wi-Fi, or a combination thereof.

The network 12 may include, for example, 2G (second generation) to 5G (fifth generation) networks, LTE (Long Term Evolution) network, GSM (Global System for Mobile communication) network, CDMA (Code Division Multiple Accesses) network, EVDO (Evolution-Data Optimization) network, PLM (Public Land Mobile) network, and/or other networks.

The network 12 may include, as another example, LAN (Local Area Network), WLAN (Wireless Local Area Network), WAN (Wide Area Network), MAN (Metropolitan Network), PSTN (Public Switched Telephone Network), Ad hoc network, managed IP network, VPN (Virtual Private Network), intranet, Internet, fiber-based network, and/or combinations thereof, or other types of networks.

The charging station $EVC_k$ is a charging device installed in domestic and/or foreign countries to charge a battery $B_n$ of an electric vehicle $EV_n$. n is an index for indicating that an object indicated by a reference sign is a plurality of objects. If the number of electric vehicles is 1 million, n is 1 to 1 million. The charging station $EVC_k$ may be installed in domestic and/or overseas parking lots, gas stations, public institutions, buildings, apartments, mansions, private houses, and the like. The charging station $EVC_k$ may be coupled with the network 12 to enable communication with the battery performance management server 11.

Preferably, the electric vehicle $EV_n$ includes a battery $B_n$ and a control system 15. The control system 15 as a computer device that controls charging/discharging operation of the battery $B_n$, and during charging/discharging of the battery $B_n$, measures voltage, current and temperature of the battery $B_n$ and records the same in a storage means 15a. The control system 15 may also perform control operations of mechanical and/or electronic mechanisms related to driving of the electric vehicle $EV_n$.

The storage means 15a is a non-transitory memory device, which is a computer storage medium capable of writing and/or erasing and/or modifying and/or transferring data. The storage means 15a may be, for example, a flash memory, a hard disk, a SSD (Solid State Disk), or other types of hardware for data storage.

The control system 15 of the electric vehicle $EV_n$ may collect operation characteristic information of the battery $B_n$ while the battery $B_n$ is being charged or discharged, and record the operation characteristic information in the storage means 15a. The operation characteristic information may include at least one selected from voltage, current and temperature of the battery $B_n$. The control system 15 may record the operation characteristic information of the battery $B_n$ together with SOC (State Of Charge) of the battery $B_n$ and/or time stamp in the storage means 15a. The control system 15 may estimate the SOC of the battery $B_n$ by using an ampere counting method, an open circuit voltage (OCV) method, an extended Kalman filter, or the like known in the art. The control system 15 may be electrically coupled to a voltage sensor, a current sensor and a temperature sensor installed at the battery $B_n$ in order to collect the operation characteristic information of the battery $B_n$.

The control system 15 may record driving characteristic information of the electric vehicle $EV_n$ in the storage means 15a. The driving characteristic information includes at least one selected from the group consisting of speed of the electric vehicle $EV_n$, driving area of the electric vehicle $EV_n$, and humidity thereof. Preferably, the control system 15 may record the driving characteristic information of the electric vehicle $EV_n$ together with a time stamp in the storage means 15a. The control system 15 may be electrically coupled to a speed sensor, a global positioning system (GPS) sensor and a humidity sensor in order to collect and store the driving characteristic information.

The charging station $EVC_k$ charges the battery $B_n$ of the electric vehicle $EV_n$ through a charging port of the electric vehicle $EV_n$, collects battery performance evaluation information while the battery $B_n$ is being charged, and transmits the battery performance evaluation information to the battery performance management server 11. In addition, the charging station $EVC_k$ may receive various control factors used for controlling charging/discharging of the battery $B_n$ from the battery performance management server 11 and transmit the same to the control system 15 of the electric vehicle $EV_n$. Then, the control system 15 of the electric vehicle $EV_n$ may update the control factor used for controlling charging/discharging of the battery $B_n$. This will be described later.

Preferably, the battery performance management system 10 may include a large-capacity database 16 connected to the battery performance management server 11.

According to an embodiment, while the electric vehicle $EV_n$ is being charged at the charging station $EVC_k$, the battery performance management server 11 may collect battery performance evaluation information including driving characteristic accumulative information of the electric vehicle $EV_n$, operation characteristic accumulative information of the battery $B_n$ and latest charging characteristic information from the charging station $EVC_k$ through the network 12, and store the battery performance evaluation information in a performance evaluation information storage unit 16a of the database 16.

Preferably, the operation characteristic accumulative information of the battery $B_n$ may include at least one information of the battery $B_n$ may include at least one selected from the group consisting of accumulative operation time of each voltage section, accumulative operation time of each current section, and accumulative operation time of each temperature section.

Preferably, the driving characteristic accumulative information of the electric vehicle $EV_n$ may include at least one selected from the group consisting of accumulative driving time of each speed section, accumulative driving time of each driving area, and accumulative driving time of each humidity section.

Preferably, the latest charging characteristic information may include at least one selected from the group consisting of SOC, voltage, current and temperature of the battery measured or estimated at a plurality of time points as operation characteristic information of the battery $B_n$ while the battery $B_n$ is being charged.

The charging station $EVC_k$ may exchange information and/or data by communicating with the control system 15 of the electric vehicle $EV_n$ while the electric vehicle $EV_n$ is being charged. In one example, the communication is performed via a data communication line included in a charging cable. Alternatively, the communication is performed via wireless communication between the charging station $EVC_k$ and the electric vehicle $EV_n$. To this end, the charging station $EVC_k$ and the electric vehicle $EV_n$ may include short-range wireless communication devices.

The charging station $EVC_k$ may transmit the information and/or data collected from the electric vehicle $EV_n$ to the battery performance management server 11 through the network 12 according to a predefined communication protocol.

The battery performance management server 11 may receive identification information of the electric vehicle $EV_n$ and identification information of the battery $B_n$ as well as the battery performance evaluation information including the operation characteristic accumulative information of the battery $B_n$, the driving characteristic accumulative information of the electric vehicle $EV_n$ and the latest charging characteristic information from the charging station $EVC_k$ while the electric vehicle $EV_n$ is being charged at the charging station $EVC_k$, and store the same in the performance evaluation information storage unit 16a of the database 16.

Here, the identification information of the electric vehicle $EV_n$ may be a vehicle model code, and the identification information of the battery $B_n$ may be a model code of the battery $B_n$.

Preferably, the charging station $EVC_k$ may receive the identification information of the electric vehicle $EV_n$ and the identification information of the battery $B_n$ as well as the battery performance evaluation information including the operation characteristic accumulative information of the battery $B_n$, the driving characteristic accumulative information of the electric vehicle $EV_n$ and the latest charging characteristic information from the control system 15 of the electric vehicle $EV_n$ while the electric vehicle $EV_n$ is being charged, and transmit the received information and/or data to the battery performance management server 11 through the network 12.

According to an embodiment, the battery performance management server 11 analyzes the operation characteristic accumulative information of the electric vehicle $EV_n$ transmitted from the charging station $EVC_k$ to generate frequency distribution data for each operation characteristic, and then store the frequency distribution data in a training data storage unit 16b of the database 16 to be matched with the identification information of the electric vehicle $EV_n$ and/or the identification information of the battery $B_n$.

According to an embodiment, in the frequency distribution data for the operation characteristic accumulative information, the variable may be voltage, current or temperature, and the frequency may be the accumulative operation time of the battery $B_n$ in each variable.

Figure 2:
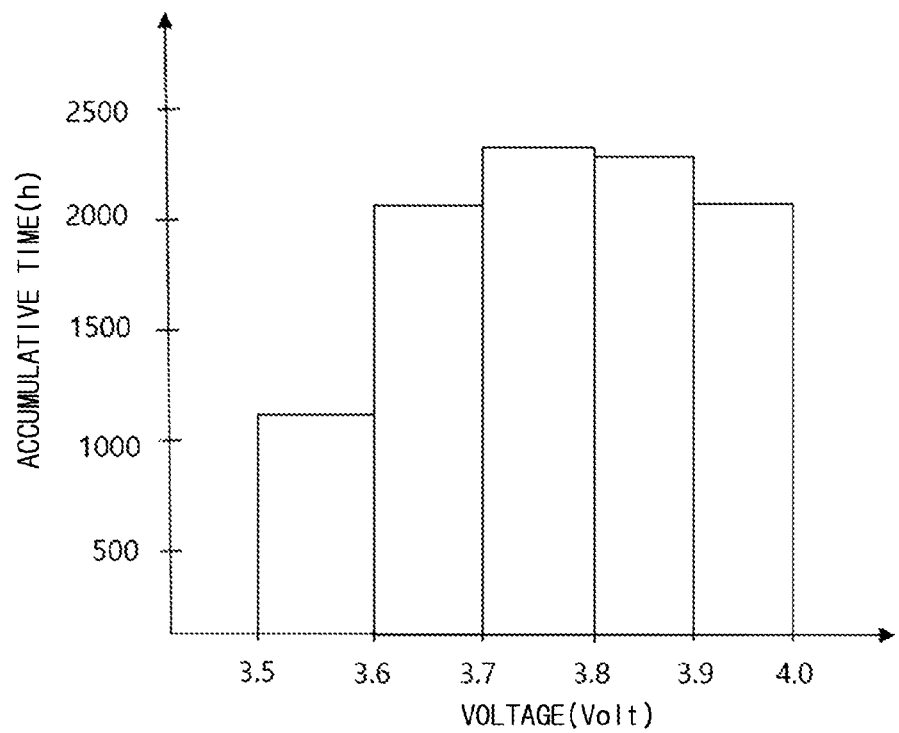
FIGS. 2 to 4 are graphs exemplarily showing frequency distribution data generated from operation characteristic accumulative information of an electric vehicle battery according to an embodiment of the present disclosure.
Figure 3:
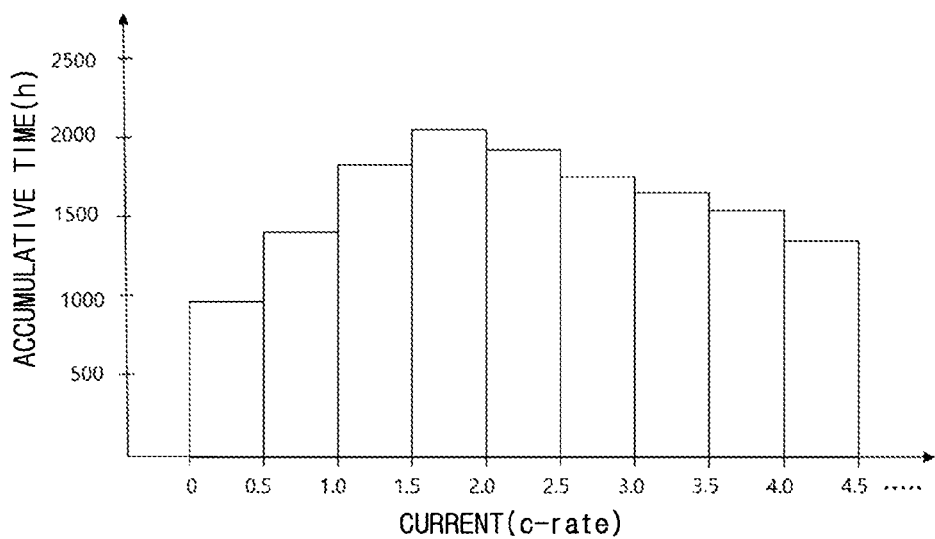
Figure 4:
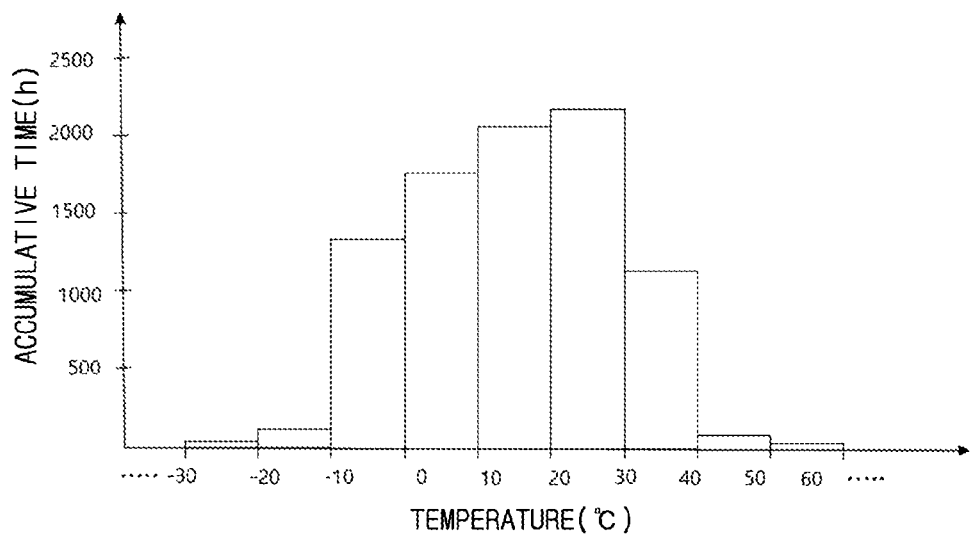

FIG. 2 is a graph showing an example of the frequency distribution data for voltage in the operation characteristic accumulative information of the battery $B_n$, FIG. 3 is a graph showing an example of the frequency distribution data for current in the operation characteristic accumulative information of the battery $B_n$, and FIG. 4 is a graph showing an example of the frequency distribution data for temperature in the operation characteristic accumulative information of the battery $B_n$.

Referring to FIGS. 2 to 4, the frequency distribution data may provide accumulative operation time of the battery $B_n$ at each voltage section, accumulative operation time of the battery $B_n$ at each current section and accumulative operation time of the battery $B_n$ at each temperature section while the electric vehicle $EV_n$ is running. The frequency distribution data represents a driving history of the electric vehicle $EV_n$, and may be used for the battery performance management server 11 to train the artificial intelligence model. This will be described later.

According to another embodiment, the battery performance management server 11 may analyze the driving characteristic accumulative information of the electric vehicle $EV_n$ transmitted from the charging station $EVC_k$ to generate frequency distribution data for each driving characteristic, and then record the frequency distribution data in the training data storage unit 16b of the database 16 to be matched with the identification information of the electric vehicle $EV_n$ and/or the identification information of the battery $B_n$.

In the frequency distribution data for the driving characteristic, the variable is speed of the electric vehicle $EV_n$, driving area of the electric vehicle $EV_n$ or humidity of the area in which the electric vehicle $EV_n$ is running, and the frequency may be accumulative driving time of the electric vehicle $EV_n$ in each variable.

Figure 5:
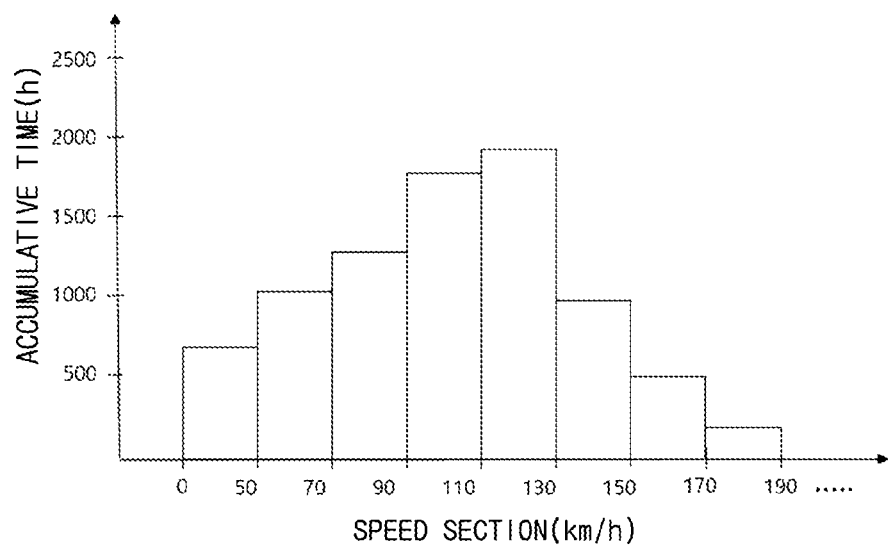
FIGS. 5 to 7 are graphs exemplarily showing frequency distribution data generated from driving characteristic accumulative information of an electric vehicle according to an embodiment of the present disclosure.
Figure 6:
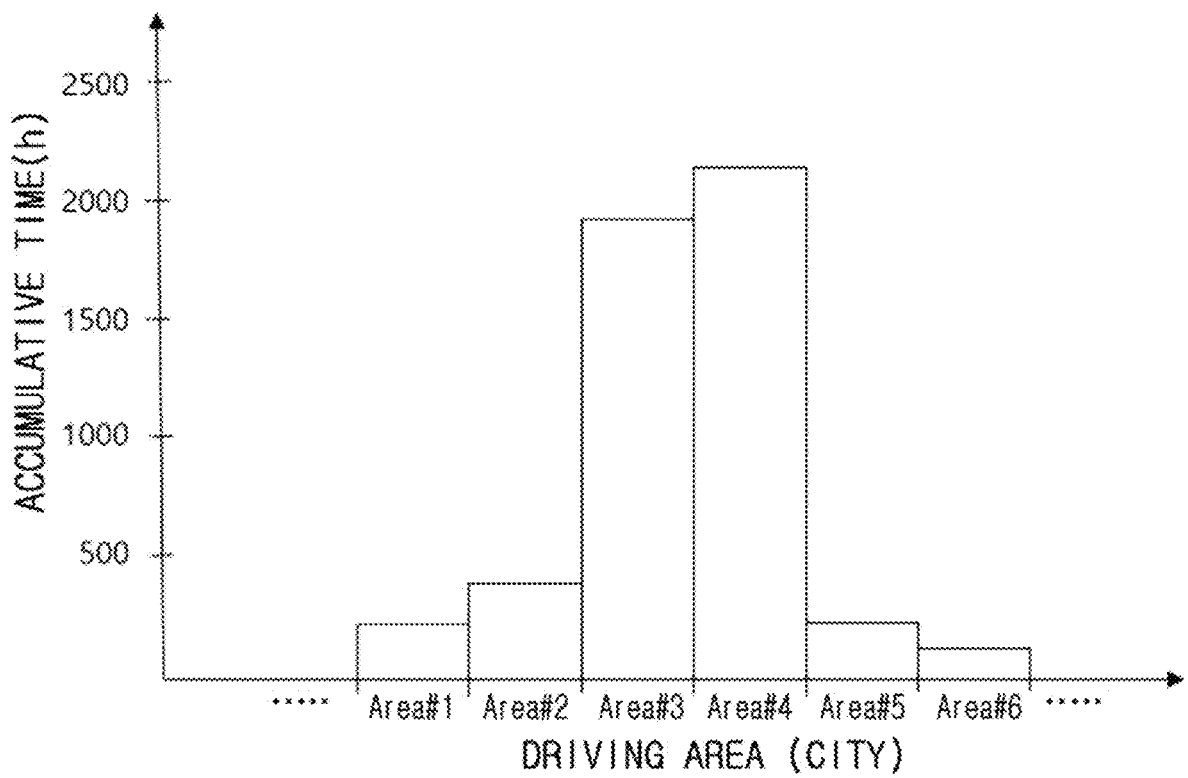
Figure 7:
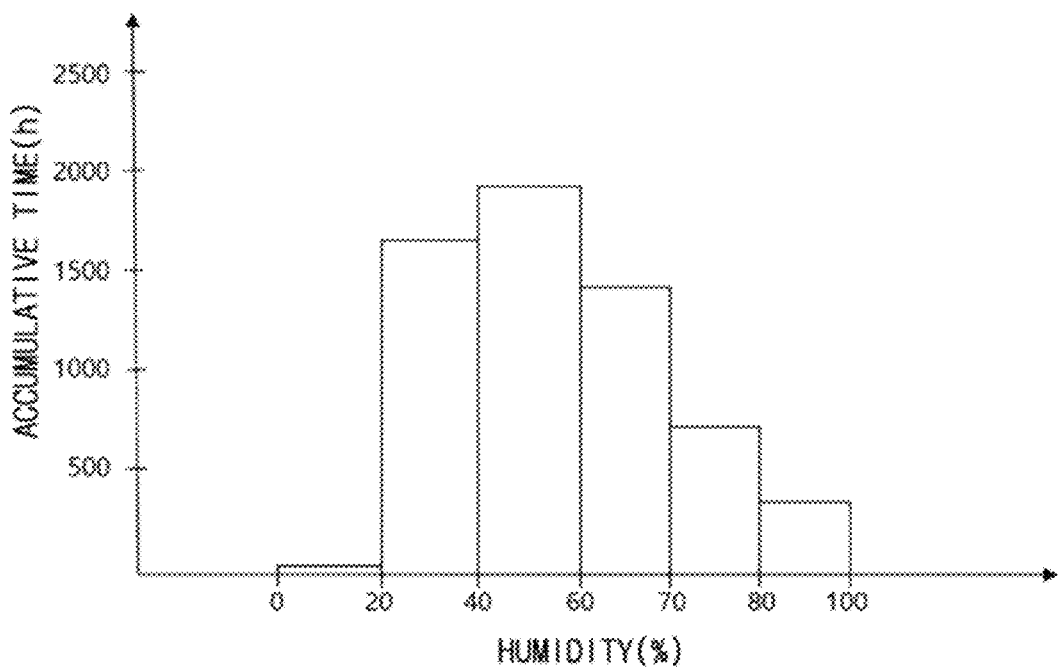

FIG. 5 is a graph showing an example of the frequency distribution data for speed in the driving characteristic accumulative information of the electric vehicle $EV_n$, FIG. 6 is a graph showing example of the frequency distribution data for driving area of the electric vehicle $EV_n$ in the driving characteristic accumulative information of the electric vehicle $EV_n$, and FIG. 7 is a graph showing an example of the frequency distribution data for humidity of an area in which the electric vehicle $EV_n$ is running in the driving characteristic accumulative information of the electric vehicle $EV_n$.

Referring to FIGS. 5 to 7, the frequency distribution data may provide information about accumulative driving time at each speed section, accumulative driving time at each driving area, and accumulative driving time at each humidity section while the electric vehicle $EV_n$ is running. The area may be a domestic and/or foreign administrative area. As an example, the area may be a city, but the present disclosure is not limited thereto. The frequency distribution data may be used for the battery performance management server 11 to train the artificial intelligence model. This will be described later.

According to another embodiment, the battery performance management server 11 may record the latest charging characteristic information of the electric vehicle $EV_n$ transmitted from the charging station $EVC_k$ in the performance evaluation information storage unit 16a of the database 16.

Preferably, the latest charging characteristic information includes at least one operation characteristic data selected from the group comprising SOC, voltage, current and temperature measured or estimated at a plurality of time points while the battery $B_n$ of the electric vehicle $EV_n$ is being charged at the charging station $EVC_k$.

The operation characteristic data measured at each measurement time point may be represented by a four-dimensional vector ($SOC_k$, $I_k$, $V_k$, $T_k$). k is an index for a measurement time point of the operation characteristic. If the number of measurements is n, k is a natural number from 1 to n, and the number of data included in the latest charging characteristic information is n.

When a predetermined condition is satisfied, the battery performance management server 11 may determine the SOH of the battery $B_n$ by using the operation characteristic data included in the latest charging characteristic information, and record the SOH in the training data storage unit 16b of the database 16 together with the identification information of electric vehicle $EV_n$ and/or the identification information of the battery $B_n$.

In an example, the battery performance management server 11 determines whether the latest charging characteristic information is collected in a preset SOH estimation voltage section. To this end, the battery performance management server 11 may examine the distribution of voltage data $V_k$ included in the latest charging characteristic information. If the determination is YES, the battery performance management server 11 may determine a charge capacity change amount by integrating the current data measured in the SOH estimation voltage section, and determine the ratio of the charge capacity change amount to a reference charge capacity change amount as the SOH. The reference charge capacity change amount is a charge capacity change amount represented while the battery $B_n$ in a BOL state is being charged in the SOH estimation voltage section, and the reference charge capacity change amount may be recorded in advance in a parameter storage unit 16c of the database 16 for each battery $B_n$ model.

In another example, the battery performance management server 11 analyzes the latest charging characteristic information to determine whether the battery $B_n$ is charged within the preset SOH estimation voltage section and a plurality of voltage data are measured under variable charging current conditions. To this end, the battery performance management server 11 may examine the distribution of voltage data $V_k$ and current data $I_k$ included in the latest charging characteristic information. If the determination is YES, the battery performance management server 11 may perform linear regression analysis on the plurality of current and voltage data measured within the preset SOH estimation voltage section in the latest charging characteristic information to determine an average value of |dV/dI| as an internal resistance value of the battery $B_n$, and determine the ratio of a reference internal resistance value to the internal resistance value as the SOH of the battery $B_n$. In this embodiment, the charging station $EVC_k$ may apply charging pulses with different AC charging currents and/or amplitudes to the battery $B_n$ while the battery $B_n$ is being charged within the preset SOH estimation voltage section. Then, a plurality of voltage data may be measured under variable charging current conditions. The reference internal resistance value is an internal resistance value of the battery $B_n$ in a BOL state, and the reference internal resistance value may be recorded in advance in the parameter storage unit 16c of the database 16 for each battery $B_n$ model.

The battery performance management server 11 may determine the SOH of the battery $B_n$ from the battery performance evaluation information including the operation characteristic accumulative information of the battery $B_n$, the driving characteristic accumulative information of the electric vehicle $EV_n$, and the latest charging characteristic information transmitted from the charging station $EVC_k$ by using an artificial intelligence model.

In the present disclosure, the SOH calculated from the latest charging characteristic information constitutes a part of big data used to train the artificial intelligence model. Therefore, the SOH determination to achieve the technical object of the present disclosure is actually performed by the artificial intelligence model trained based on the big data.

The reason is that, since the SOH calculated from the latest charging characteristic information has is a limitation in that it can be determined only when a predetermined condition is satisfied and the past usage history of the battery $B_n$ is not sufficiently considered, the SOH determined by the artificial intelligence model trained based on big data has higher accuracy and reliability.

Preferably, the artificial intelligence model is a software algorithm coded with a programming language, and may be an artificial neural network. However, the present disclosure is not limited thereto.

Figure 8:
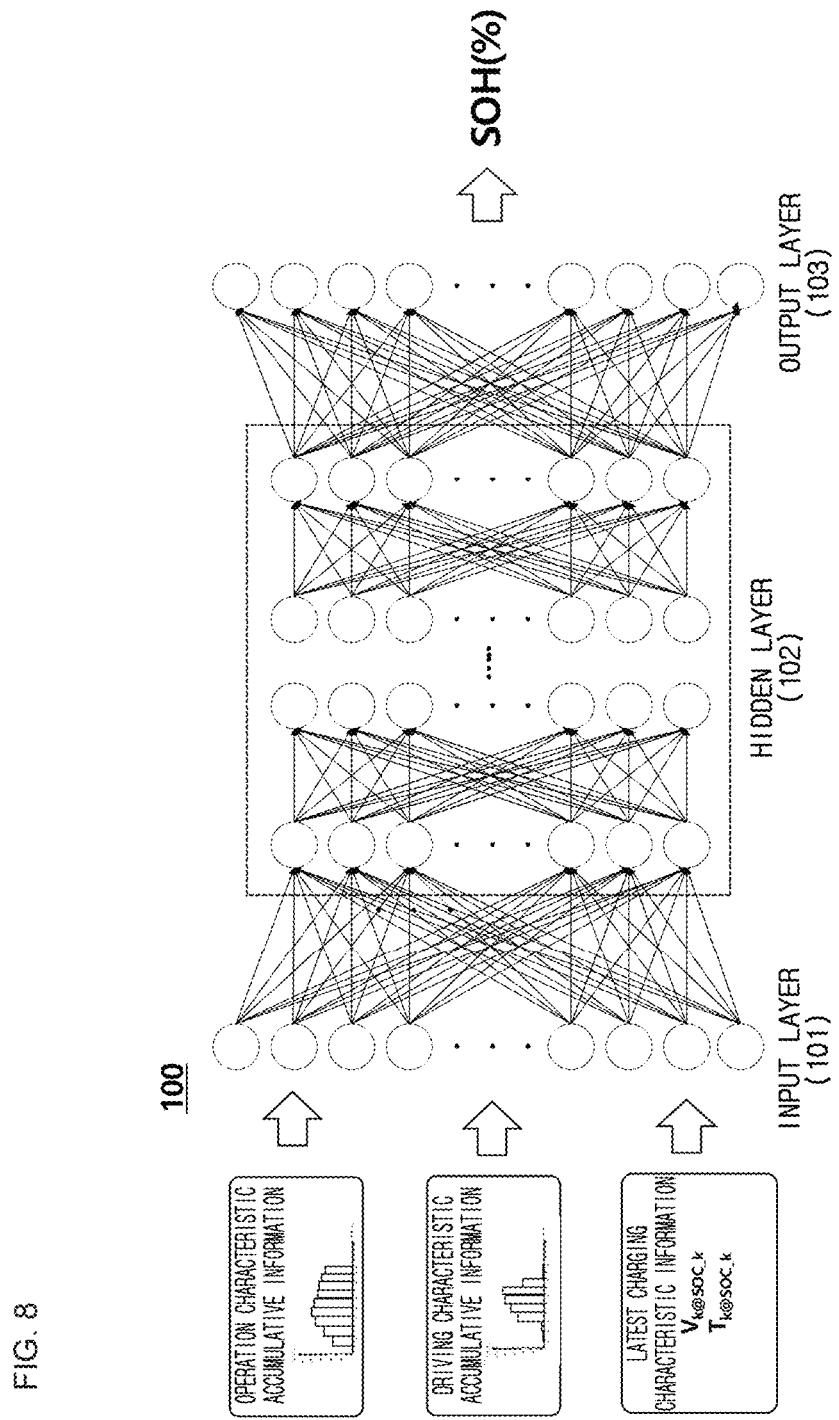
FIG. 8 is a diagram exemplarily showing a structure of an artificial neural network according to an embodiment of the present disclosure.

FIG. 8 is a diagram exemplarily showing a structure of an artificial neural network 100 according to an embodiment of the present disclosure.

Referring to FIG. 8, the artificial neural network 100 includes an input layer 101, a plurality of hidden layers 102, and an output layer 103. The input layer 101, the plurality of hidden layers 102 and the output layer 103 include a plurality of nodes.

When the battery performance management server 11 trains the artificial neural network 100 or determines the SOH of the battery $B_n$ by using the artificial neural network 100, the frequency distribution data generated from the operation characteristic accumulative information of the battery $B_n$, the frequency distribution data generated from the driving characteristic accumulative information of the electric vehicle $EV_n$, and the data included in the latest charging characteristic information, collected from the charging station $EVC_k$, may be input to the input layer 101.

The operation characteristic accumulative information input (assigned) to the nodes of the input layer 101 may include a first accumulative time value for each voltage section and/or a second accumulative time value for each current section and/or a third accumulative time value for each temperature section. The first to third accumulative time values are preferably normalized as a ratio based on a total usable time corresponding to the guaranteed life of the battery $B_n$. In an example, if the accumulative time value in a specific voltage section is 1,000 hours and the total available time is 20,000 hours, the normalized accumulative time value is 1/20 (0.05).

The number of first accumulative time values may correspond to the number of voltage sections, the number of second accumulative time values may correspond to the number of current sections, and the number of third accumulative time values may correspond to the number of temperature sections. For example, if the number of voltage sections is 5, the number of current sections is 9, and the number of temperature sections is 10, the numbers of first to third accumulative time values are 5, 9, and 10, respectively.

Preferably, the input layer 101 may include a number of nodes corresponding to the number of first accumulative time values and/or the number of second accumulative time values and/or the number of third accumulative time values.

The driving characteristic accumulative information input (assigned) to the nodes of the input layer 101 may include a fourth accumulative time value for each speed section and/or a fifth accumulative time value for each driving area and/or a sixth accumulative time value for each humidity section. The fourth to sixth accumulative time values are preferably normalized as a ratio based on the total usable time corresponding to the guaranteed life of the battery $B_n$. In an example, if the accumulative time value in a specific speed section is 2,000 hours and the total available time is 20,000 hours, the normalized accumulative time value is 1/10 (0.1).

The number of fourth accumulative time values corresponds to the number of speed sections, the number of fifth accumulative time values corresponds to the number of areas in which the electric vehicle $EV_n$ is running, and the number of sixth accumulative time values corresponds to the number of humidity sections. For example, if the number of speed sections is 8, the number of driving areas is 20, and the number of temperature sections is 6, the numbers of fourth to sixth accumulative time values are 8, 20, and 6, respectively.

Preferably, the input layer 101 may include a number of nodes corresponding to the number of fourth accumulative time values and/or the number of fifth accumulative time values and/or the number of sixth accumulative time values.

The latest charging characteristic information input (assigned) to the nodes of the input layer 101 may include voltage data and temperature data. Since both the voltage and temperature of the battery $B_n$ are measured for each SOC, 100 nodes may be assigned for inputting the voltage data, and another 100 nodes may be assigned for inputting the temperature data.

Here, 100 is the number of nodes corresponding to SOC from 1% to 100%, assuming that the SOC varies by 1% from 0% to 100%. If the voltage and temperature of the battery $B_n$ are measured in the SOC section of 31% to 50%, voltage data may be input to 20 nodes corresponding to 31% to 50%, and temperature data may be input to another 20 nodes corresponding to 31% to 50%. In addition, voltage data and temperature data may not be input to nodes corresponding to SOC of 1% to 30% section and SOC of 51% to 100% section, and 0 may be assigned thereto.

Meanwhile, voltage data and temperature data measured in SOC including a value below a decimal point may be converted into voltage data and temperature data of a nearby SOC without a decimal point through interpolation or extrapolation. In some cases, the temperature data may be excluded from the input data in order to reduce the amount of training computation of the artificial neural network. In this case, the input layer 101 may not include nodes to which temperature data is input.

The output layer 103 may include a node to which SOH information of the battery $B_n$ is output. As shown in FIG. 8, if the artificial neural network 100 is designed based on a stochastic model, the output layer 103 may include a plurality of nodes for outputting the probability distribution of SOH of the battery $B_n$.

In an example, if the artificial neural network 100 is designed to determine the SOH between 71% and 100% in the unit of 1% unit, the output layer 103 may include 30 nodes in total. In this case, a SOH corresponding to a node outputting the highest probability value among the 30 nodes may be determined as the SOH of the battery $B_n$. For example, if the probability output from the $10^{th}$ node is highest, the SOH of the battery $B_n$ may be determined to be 80%. It is obvious to those skilled in the art that the number of nodes can be further increased to improve the accuracy of the SOH.

Alternatively, if the artificial neural network 100 is designed based on a deterministic model, the output layer 103 may include at least one node for directly outputting the SOH of the battery $B_n$.

The number of the hidden layers 102 interposed between the input layer 101 and the output layer 103 and the number of nodes included in each hidden layer 102 may be appropriately selected in consideration of the amount of training computation of the artificial neural network 100 and the accuracy and reliability of the artificial neural network 100.

In the artificial neural network 100, a sigmoid function may be used as the activation function. Alternatively, various activation functions known in the art, such as a SiLU (Sigmoid Linear Unit) function, a ReLu (Rectified Linear Unit) function, a softplus function, an ELU (Exponential Linear Unit) function, a SQLU (Square Linear Unit) function, or the like may be used.

In the artificial neural network 100, initial values of connection weights and biases between nodes may be set randomly. In addition, the connection weights and the biases may be optimized in the process of training the artificial neural network.

In one embodiment, the artificial neural network may be trained by a backpropagation algorithm. Also, the connection weights and biases may be optimized by an optimizer while the artificial neural network is being trained.

In an embodiment, a SGD (Stochastic Gradient Descent) algorithm may be used as the optimizer. Alternatively, a NAG (Nesterov Accelerated Gradient) algorithm, a momentum algorithm, a Nadam algorithm, an Adagrad algorithm, a RMSProp algorithm, an Adadelta algorithm, an Adam algorithm, or the like may be used.

The battery performance management server 11 may periodically repeatedly train the artificial neural network 100 by using the training data stored in the training data storage unit 16b of the database 16.

To this end, by using the method described above, the battery performance management server 11 collects training data while a number of electric vehicles $EV_n$ are being charged at the plurality of charging stations $EVC_k$ and accumulatively records the training data in the training data storage unit 16b of the database 16.

The training data includes training input data and training output data. The training input data may include frequency distribution data generated from the driving characteristic accumulative information of the electric vehicle $EV_n$, frequency distribution data generated from the operation characteristic accumulative information of the battery $B_n$, and data included in the latest charging characteristic information. In addition, the training output data includes the SOH of the battery $B_n$. The training data may be obtained while the electric vehicle $EV_n$ is being charged at the charging station $EVC_k$.

Preferably, the training data may be recorded in the training data storage unit 16b of the database 16 to be matched with the identification information of the electric vehicle $EV_n$ and/or the identification information of the battery $B_n$. Therefore, in the training data storage unit 16b, numerous training data collected from electric vehicles $EV_n$ of the same model equipped with batteries $B_n$ of the same model may be recorded. In addition, since the training data is continuously collected at the charging station $EVC_k$, the amount of the training data may be increased more and more.

Preferably, the battery performance management server 11 may train the artificial neural network separately for each model of the electric vehicles $EV_n$ and/or each model of the batteries $B_n$ in order to reduce the training computational load of the artificial neural network 100 and improve the reliability of the output estimated by the artificial neural network 100 through distributed processing of data.

That is, when the battery performance management server 11 periodically trains the artificial neural network 100, among the training data stored in the training data storage unit 16b, the battery performance management server 11 may extract training data for the electric vehicles $EV_n$ of the same model and/or the batteries $B_n$ of the same model, and independently train the artificial neural network 100 dedicated to the corresponding model of the electric vehicle $EV_n$ and/or the corresponding model of the battery $B_n$. In addition, if the amount of training data newly collected for the model of the electric vehicle $EV_n$ and/or the model of the battery $B_n$ increases over a reference value, the battery performance management server 11 may restart training the corresponding artificial neural network 100 to further improve the accuracy of the artificial neural network 100.

Meanwhile, if the frequency distribution data (see FIG. 6) generated from the driving accumulative time information of each driving area in the driving characteristic accumulative information of the electric vehicle $EV_n$ has too many variables, the artificial neural network 100 may be trained separately for each wide area that groups a plurality of areas.

For example, it is assumed that the number of models of the electric vehicles $EV_n$ is 100 in total, the number of models of the batteries $B_n$ mounted to the electric vehicles $EV_n$ is 10 in total, and the electric vehicles $EV_n$ are running in 1,000 cities in and out of the country. In this case, the battery performance management server 11 may group cities according to a predetermined criterion, and train a number of artificial neural networks corresponding to 100*10*(the number of area groups). In an example, the cities may be grouped on a country-by-country basis. In another example, the cities may be grouped in the unit of a predetermined number of neighboring cities within the same country.

In this case, when the battery performance management server 11 trains the artificial neural network 100, the battery performance management server 11 may extract only training data with the same model of the battery $B_n$ and/or the same model of the electric vehicle $EV_n$ and with the same variable (cities) of the frequency distribution data for the driving area from the training data stored in the training data storage unit 16b, and independently train the artificial neural networks 100 dedicated to the driving area and/or the model of the electric vehicle $EV_n$ and/or the model of the battery $B_n$. In addition, if the amount of new training data with the same driving area and/or the same model of the electric vehicle $EV_n$ and/or the same model of the battery $B_n$ increases over a reference value, the battery performance management server 11 may restart training the corresponding artificial neural networks 100 to further improve the accuracy of the artificial neural networks 100.

In the present disclosure, the artificial intelligence model is not limited to the artificial neural network. Therefore, in addition to the artificial neural network, a Gaussian process model or the like may be used. When training the correlation between the accumulative driving characteristic information of the electric vehicle $EV_n$ and/or the accumulative operation characteristic information of the battery $B_n$ and/or the latest charging characteristic data and the SOH, a SVM (Support Vector Machine), K-Nearest Neighbor Algorithm, Naive-Bayes Classifier, or the like may be used. If there is a problem with the reliability of SOH information used for training, K-Means Clustering or the like may be used as an auxiliary means to obtain SOH information.

Meanwhile, the battery performance management server 11 may include an auxiliary artificial neural network trained by using the operation characteristic accumulative information of each cycle and the latest charging characteristic information of each cycle provided from a battery manufacturer.

Figure 9:
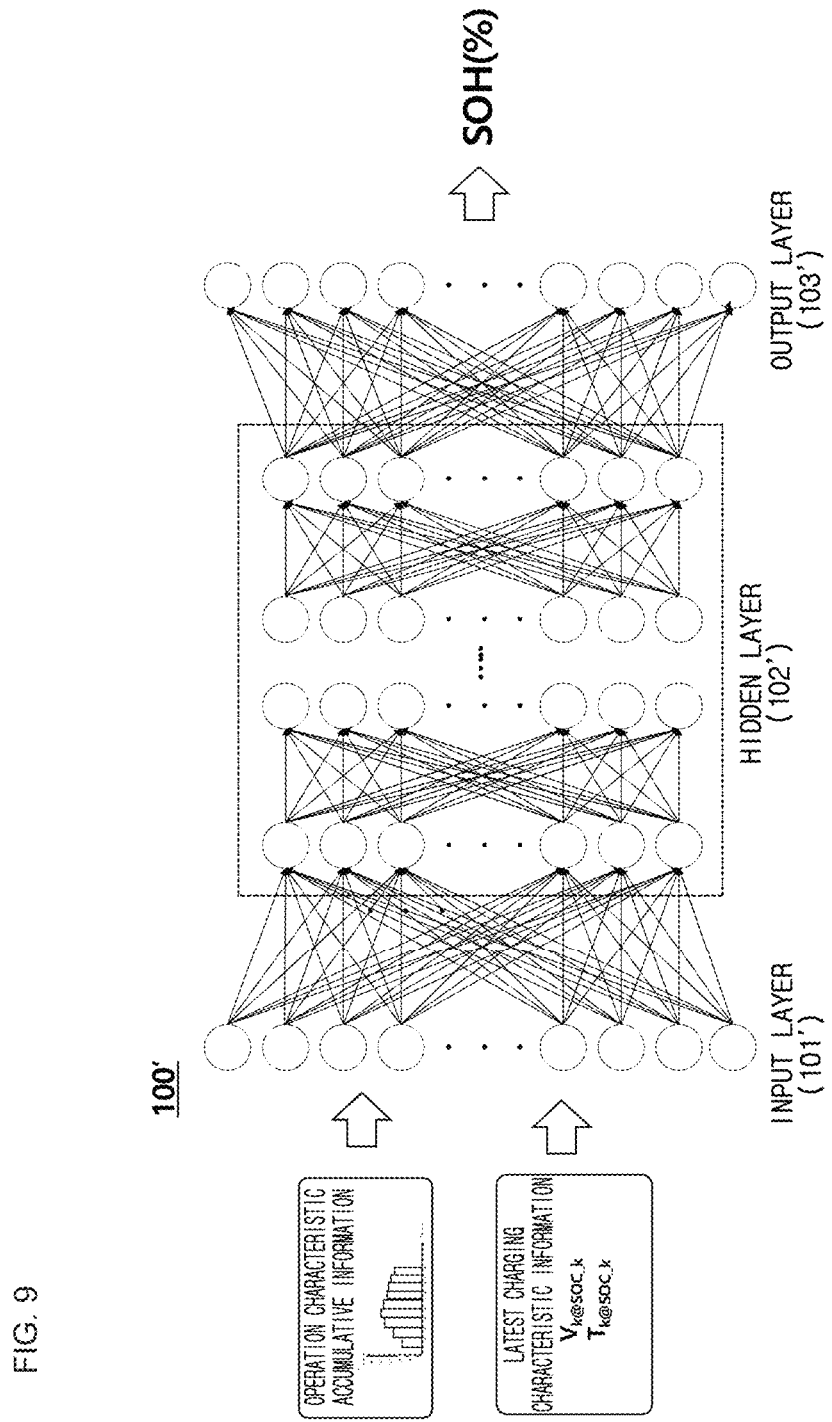
FIG. 9 is a diagram exemplarily showing a structure of an auxiliary artificial neural network according to an embodiment of the present disclosure.

FIG. 9 is a diagram exemplarily showing a structure of an auxiliary artificial neural network 100' according to an embodiment of the present disclosure.

Referring to FIG. 9, the auxiliary artificial neural network 100' includes an input layer 101', a plurality of hidden layers 102' and an output layer 103'. The auxiliary artificial neural network 100' is substantially identical to the artificial neural network 100 shown in FIG. 8, except that the input layer 101' has no node to which data corresponding to the driving characteristic accumulative information of the electric vehicle $EV_n$ is input.

The auxiliary artificial neural network 100' may be used to determine the SOH of the battery $B_n$ when the artificial neural network 100 is not sufficiently trained.

The battery performance management server 11 may be communicatively connected to the battery data providing server 17 through the network 12 to collect data used for training the auxiliary artificial neural network 100'.

Preferably, the battery data providing server 17 may be installed in the battery manufacturer. The battery data providing server 17 transmit the operation characteristic accumulative information of each cycle, the latest charging characteristic information of each cycle and the SOH of the battery $B_n$ of each cycle, obtained from the charging/discharging cycle experiment on the battery $B_n$ mounted to the electric vehicle $EV_n$, to the battery performance management server 11 through the network 12 together with the identification information of the battery $B_n$.

The charging/discharging cycle experiment refers to an experiment in which the battery $B_n$ is charged and discharged repeatedly a predetermined number of times under various charging/discharging conditions using a device called a charging/discharging simulator. The charging/discharging cycle experiment is an essential experiment conducted by battery manufacturers before the battery $B_n$ is commercialized. It is desirable that the charging/discharging conditions simulate various driving conditions (mountain driving, rough road driving, city driving, driving at high speed, etc.) of the electric vehicle $EV_n$ and various climatic conditions (temperature, humidity, etc.).

The charging/discharging simulator is an automated experiment equipment in which a control computer, a charging/discharging device and a temperature/humidity control chamber are combined. Whenever charging of each cycle is performed, the charging/discharging simulator may generate operation characteristic accumulative information by accumulating accumulative operation time of each voltage section and/or accumulative operation time of each current section and/or accumulative operation time of each temperature section, measure or estimate SOC and/or voltage and/or current and/or temperature to generate latest charging characteristic information while charging is in progress, and record the latest charging characteristic information in the storage means.

In addition, if the charging of each cycle is completed, the charging/discharging simulator may determine the SOH of the battery $B_n$ based on a charging completion time point. The SOH may be calculated from the charge capacity change amount determined by the ampere counting method in a predetermined charging voltage section or the internal resistance of the battery obtained through linear regression analysis of the voltage and current data measured in a predetermined charging voltage section, as being already described above.

The battery data providing server 17 may include a database 18 that stores data obtained through the charging/discharging cycle experiment. In each charging/discharging cycle for the battery $B_n$, the battery data providing server 17 may store the operation characteristic accumulative information of each cycle, the latest charging characteristic information of each cycle, and the SOH of each cycle in the database 18 to be matched with the identification information of the battery $B_n$. The data stored in the database 18 may be transmitted through a network from the charging/discharging simulator.

The battery data providing server 17 may periodically transmit auxiliary training data including the operation characteristic accumulative information of each cycle, the latest charging characteristic information of each cycle and the SOH of each cycle stored in the database 18 to the battery performance management server 11 through the network 12 along with the identification information of the battery $B_n$. The number of auxiliary training data corresponds to the number of charging/discharging cycle experiments. For example, if the charging/discharging cycle experiment for a battery of a specific model is performed 200 times, the number of auxiliary training data is 200.

The battery performance management server 11 may record the auxiliary training data transmitted from the battery data providing server 17 in the training data storage unit 16b of the database 16 to be matched with the identification information of the battery $B_n$.

Preferably, in the auxiliary training data, the information about the accumulative operation time of each voltage section and/or the accumulative operation time of each current section and/or the accumulative operation time of each temperature section included in the operation characteristic accumulative information may be converted into frequency distribution data and stored in the training data storage unit 16b of the database 16.

After the auxiliary training data is stored in the database 16, the battery performance management server 11 may train the auxiliary artificial neural network 100' for each battery model by using the auxiliary training data.

The structure of the auxiliary artificial neural network 100' is similar to that of the artificial neural network 100 shown in FIG. 8, but is different in that the node to which the frequency distribution data generated from the driving characteristic accumulative information of the electric vehicle $EV_n$ is input is deactivated. However, the training method and other features of the auxiliary artificial neural network 100' are substantially the same as described above.

By complementarily using the auxiliary artificial neural network 100' trained by the auxiliary training data transmitted from the battery data providing server 17 and the artificial neural network 100 trained by the data transmitted from the plurality of charging stations $EVC_k$, the battery performance management server 11 may determine the SOH of the battery $B_n$ after the electric vehicle $EV_n$ is charged at the charging station $EVC_k$, and provide a control factor used to control the charging/discharging of the battery $B_n$ according to the determined SOH to the control system 15 of the electric vehicle $EV_n$.

Hereinafter, referring to FIGS. 10 and 11, the process of collecting training data of the artificial intelligence model while the electric vehicle $EV_n$ is being charged at the charging station $EVC_k$, the process of determining the SOH of the battery $B_n$, and the process of updating the control factor used to control the charging/discharging of the battery $B_n$ according to the SOH will be described in detail.

Figure 10:
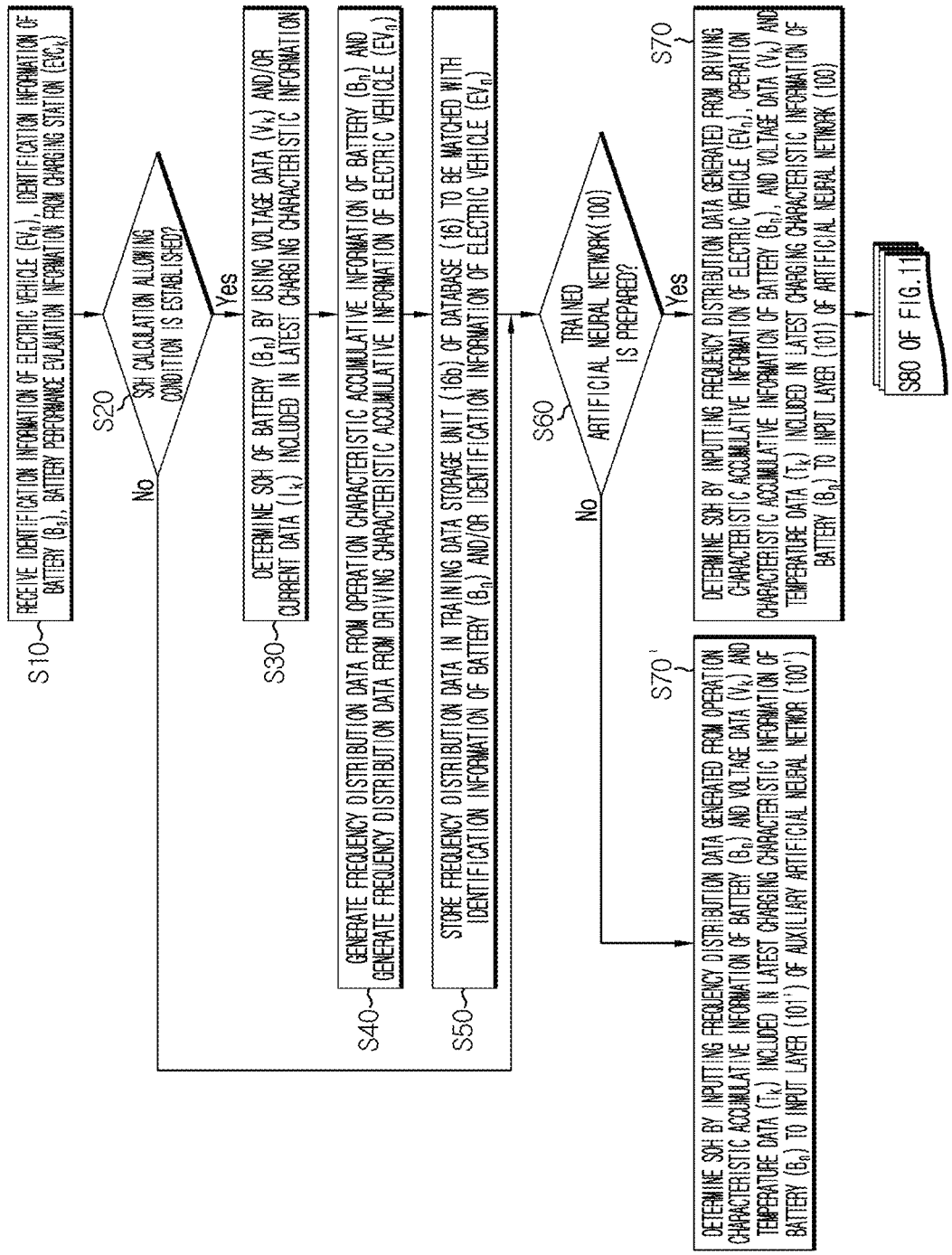

Referring to FIG. 10, in Step S10, the battery performance management server 11 receives the identification information of the battery $B_n$ and the identification information of the electric vehicle $EV_n$ as well as the battery performance evaluation information including the driving characteristic accumulative information of the electric vehicle $EV_n$, the operation characteristic accumulative information of the battery $B_n$ and the latest charging characteristic information from the charging station $EVC_k$ through the network 12 while the electric vehicle $EV_n$ is being charged at the charging station $EVC_k$ or after being completely charged. In Step S10, the battery performance management server 11 may record the battery performance evaluation information transmitted through the network 12 in the performance evaluation information storage unit 16a of the database 16.

In Step S20, the battery performance management server 11 determines whether the condition for allowing calculation of the SOH is satisfied with reference to the voltage data $V_k$ and/or the current data $I_k$ included in the latest charging characteristic information.

In an example, the SOH calculation allowing condition may be established when the voltage data $V_k$ is measured while the battery $B_n$ is charged within a preset SOH estimation voltage section. In another example, the SOH calculation allowing condition may be established when the battery $B_n$ is charged within the preset SOH estimation voltage section and a plurality of voltage data $V_k$ are measured under a variable charging current condition.

If the determination of Step S20 is YES, Step S30 is executed, and if the determination of Step S20 is NO, Step S60 is executed.

In Step S30, the battery performance management server 11 determines the SOH of the battery $B_n$ by using the voltage data $V_k$ and/or the current data $I_k$ included in the latest charging characteristic information. The SOH determination method has already been described above. After Step S30, Step S40 proceeds.

In Step S40, the battery performance management server 11 generates frequency distribution data for voltage and/or current and/or temperature from the operation characteristic accumulative information of the battery $B_n$, and generate frequency distribution data for speed and/or driving area and/or humidity from the driving characteristic accumulative information of the electric vehicle $EV_n$. After Step S40, Step S50 proceeds.

In Step S50, the battery performance management server 11 stores the frequency distribution data generated from the operation characteristic accumulative information, the frequency distribution data generated from the driving characteristic accumulative information, the latest charging characteristic information, and the SOH of the battery $B_n$ determined in Step S30 in the training data storage unit 16b of the database 16 to be matched with the identification information of the battery $B_n$ and/or the identification information of the electric vehicle $EV_n$. Here, the frequency distribution data generated from the operation characteristic accumulative information, the frequency distribution data generated from the driving characteristic accumulative information, and the latest charging characteristic information correspond to the training input data, and the SOH of the battery $B_n$ corresponds to the training output data. After Step S50, Step S60 proceeds.

In Step S60, the battery performance management server 11 determines whether a trained artificial neural network 100 corresponding to the model of the battery $B_n$ and/or the model of the electric vehicle $EV_n$ is prepared with reference to the identification information of the battery $B_n$ and/or the identification information of the electric vehicle $EV_n$.

As an example, it is assumed that the model of the battery $B_n$ is BBB001 and the model of the electric vehicle $EV_n$ is EV001. In this case, the battery performance management server 11 determines whether there is an artificial neural network 100 trained by using data over a reference value collected while electric vehicles of the EV001 model equipped with the battery of the BBB001 model are being charged at the charging station $EVC_k$. The reference value may be, for example, several hundreds to several thousands.

In Step S60, the battery performance management server 11 may determine whether there is an artificial neural network 100 trained by the data collected from the electric vehicles $EV_n$ with the same model of the battery $B_n$ and/or the same model of the electric vehicle $EV_n$ and the same driving area with reference to the frequency distribution data for driving area generated in Step S40.

As an example, it is assumed that the model of the battery $B_n$ is BBB001, the model of the electric vehicle $EV_n$ is EV001, and the area variable of the frequency distribution data generated from the driving area of the electric vehicle $EV_n$ is a city in Korea. In this case, the battery performance management server 11 determines whether an artificial neural network 100 trained using data over the reference value collected while electric vehicles of the EV001 model equipped with the battery of the BBB001 model are being charged at the charging stations $EVC_k$ in Korea is prepared. The reference value may be, for example, several hundreds to several thousands.

If the determination of Step S60 is YES, Step S70 proceeds.

In Step S70, the battery performance management server 11 inputs the frequency distribution data generated from the driving characteristic accumulative information of the electric vehicle $EV_n$, the frequency distribution data generated from the operation characteristic accumulative information of the battery $B_n$, and the voltage data $V_k$ and the temperature data $T_k$ included in the latest charging characteristic information of the battery $B_n$ to the input layer 101 of the artificial neural network 100. Since the artificial neural network 100 is in a state of being trained by the training data greater than the reference value, if data is input through the input layer 101, the SOH of the battery $B_n$ is output through the output layer 103. Then, the battery performance management server 11 may determine a current SOH of the battery $B_n$ through the artificial neural network 100. After Step S70, Step S80 of FIG. 11 proceeds.

Meanwhile, if the determination of Step S60 is NO, in Step S70', the battery performance management server 11 may determine the current SOH of the battery $B_n$ by inputting the frequency distribution data generated from the operation characteristic accumulative information of the battery $B_n$ (see FIGS. 2 to 4) and the voltage data $V_k$ and the temperature data $T_k$ included in the latest charging characteristic information of the battery $B_n$ to the input layer 101' of the auxiliary artificial neural network 100'. The auxiliary artificial neural network 100' is an artificial neural network trained in advance using the charging/discharging cycle experiment data for the battery $B_n$ provided from the battery data providing server 17, and its training method has already been described above.

If the current SOH of the battery $B_n$ is determined in Step S70 or Step S70', Step S80 of FIG. 11 proceeds.

In Step S80, the battery performance management server 11 stores the SOH determined through the artificial neural network 100 or the auxiliary artificial neural network 100' in a SOH information storage unit 16d of the database 16 to be matched with the identification information of the electric vehicle $EV_n$ and/or the identification information of the battery $B_n$ together with a time stamp. After Step S80, Step S90 proceeds.

In Step S90, the battery performance management server 11 determines whether the current SOH increases over a reference value by comparing a previous SOH of the battery $B_n$ recorded in the SOH information storage unit 16d of the database 16 with the current SOH.

The reference value is a predefined value and is used for determining whether or not to execute an update logic for various control factors used in controlling the charging/discharging of the battery $B_n$. As an example, the reference value may be 3 to 5%.

In an example, the control factor may be at least one selected from a charging current magnitude applied for each SOC section, a charging upper limit voltage value, a discharging lower limit voltage value, a maximum charging current, a maximum discharging current, a minimum charging current, a minimum discharging current, a maximum temperature, a minimum temperature, a power map for each SOC and an internal resistance map for each SOC.

In another example, when the battery $B_n$ is pulse-charged/discharged, the control factor may include at least one selected from an upper limit of a pulse current duty ratio (a ratio of a pulse sustain period to a pulse rest period), a lower limit of the pulse current duty ratio, an upper limit of a pulse current duration, a lower limit of the pulse current duration, a maximum value of the pulse current, and a minimum value of the pulse current.

In still another example, when the battery $B_n$ is step-charged, the control factor may include a charging current magnitude applied for each SOC section.

In still another example, when the battery $B_n$ is charged in a CC/CV mode, the control factor may include at least one selected from a current magnitude in a constant-current charging (CC) mode, a cutoff voltage at which the constant-current charging (CC) mode ends, and a voltage magnitude in a constant-voltage charging (CV) mode.

If the determination of Step S90 is YES, Step S100 proceeds.

In Step S100, the battery performance management server 11 reads a latest control factor corresponding to the current SOH of the battery $B_n$ with reference to the control factor storage unit 16e of the database 16, and transmits a battery performance evaluation result including the current SOH and the latest control factor to the charging station $EVC_k$ through the network 12.

The control factor storage unit 16e includes a look-up table that defines control factor information for each SOH of the battery $B_n$. The look-up table is recorded to be matched with the identification information of the battery $B_n$ and/or the identification information of the electric vehicle $EV_n$. Therefore, the control factor is preferably read from a look-up table corresponding to the model of the battery $B_n$ and/or the model of the electric vehicle $EV_n$. After Step S100, Step S110 proceeds.

In Step S110, the charging station $EVC_k$ receives the battery performance evaluation result including the current SOH of the battery $B_n$ and the corresponding latest control factor through the network 12, and then transmits the battery performance evaluation result to the control system 15 of the electric vehicle $EV_n$ through the communication line of the charging cable or short-range wireless communication. After Step S110, Step S120 proceeds.

In Step S120, the control system 15 of the electric vehicle $EV_n$ updates the previous control factor used to control the charging/discharging of the battery $B_n$ with reference to the latest control factor included in the battery performance evaluation result. Accordingly, after charging at the charging station $EVC_k$ is completed, the control system 15 may safely control the charging/discharging of the battery $B_n$ by using the latest control factor that is optimally updated according to the SOH of the battery $B_n$.

Meanwhile, if the determination of Step S90 is NO, Step S130 proceeds.

In Step S130, because the current SOH of the battery $B_n$ does not increase over the reference value, the battery performance management server 11 sends the battery performance evaluation result including the current SOH to the charging station $EVC_k$ through the network 12, together with a message indicating that the control factor does not need to be updated. After Step S130, Step S140 proceeds.

In Step S140, if the battery performance evaluation result is received, the charging station $EVC_k$ transmits the battery performance evaluation result to the control system 15 of the electric vehicle $EV_n$ through a charging cable or short-range wireless communication. After Step S140, Step S150 proceeds.

In Step S150, the control system 15 of the electric vehicle $EV_n$ checks the message indicating that the previous control factor does not need to be updated from the battery performance evaluation result, and maintains the control factor used to control the charging/discharging of the battery $B_n$ without change.

Although not shown in the figures, the battery performance management server 11 may complementally utilize the auxiliary artificial neural network 100' when determining the SOH of the battery $B_n$, even after the artificial neural network 100 is completely trained.

That is, after determining the SOH (first value) of the battery $B_n$ by using the artificial neural network 100 in Step S70, the battery performance management server 11 may further execute Step S70' to determine the SOH (second value) of the battery $B_n$ by using the auxiliary artificial neural network 100'. Then, a weighted average value of the first value and the second value may be determined as the SOH of the battery $B_n$. In this case, the weight endowed to the first value may be gradually increased than the weight endowed to the second value as the amount of training data used to train the artificial neural network 100 increases.

As an example, the weight endowed to the first value may be determined as the ratio of the data used for training the artificial neural network 100 to the total amount of data used to train the artificial neural network 100 and the auxiliary artificial neural network 100'.

According to the above modified embodiment, as the artificial neural network 100 is repeatedly trained, the SOH of the battery $B_n$ converges to the SOH (first value) determined by the artificial neural network 100. Conversely, if the amount of training data used for training the artificial neural network 100 is small, the SOH of the battery $B_n$ converges to the SOH (second value) determined by the auxiliary artificial neural network 100.

In the present disclosure, the control system 15 of the electric vehicle $EV_n$ may provide the current SOH of the battery $B_n$ included in the battery performance evaluation result transmitted from the charging station $EVC_k$ to a driver using a graphical user interface through an integrated control display panel installed at the electric vehicle $EV_n$. Preferably, the graphical user interface may include a number and/or graphical gauge indicating the SOH.

Meanwhile, the battery performance management system 10 according to an embodiment of the present disclosure as described above may further include an insurance company server 19 communicatively connected to the battery performance management server 11 through the network 12.

In this case, the battery performance management server 11 may be configured to transmit the SOH and a total driving distance of the electric vehicle $EV_n$ and the identification information of the electric vehicle $EV_n$ to the insurance company server 19. The total driving distance of the electric vehicle $EV_n$ may be transmitted from the control system 15 of the electric vehicle $EV_n$ through the charging station $EVC_k$ while the electric vehicle $EV_n$ is being charged at the charging station $EVC_k$.

The insurance company server 19 may be configured to calculate an insurance premium for the corresponding electric vehicle $EV_n$ with reference to the identification information of the electric vehicle $EV_n$ by using the SOH information.

That is, the insurance company server 19 may calculate the price of the electric vehicle $EV_n$ by increasing a depreciation ratio of the electric vehicle $EV_n$ as the SOH of the battery $B_n$ is higher. In addition, if the SOH of the battery $B_n$ is larger than an average compared to the total driving distance of the electric vehicle $EV_n$, the insurance company server 19 may assume that the driving habit of the driver is not good and increase the insurance premium by raising a risk rate due to an automobile accident.

It is obvious that the insurance premium calculated by the insurance company server 19 may be stored in a database (not shown) of the insurance company server 19 and then referenced in renewing the insurance of the electric vehicle $EV_n$.

The battery performance management method using an electric vehicle charging station according to an embodiment of the present disclosure may be coded with a plurality of processor executive commands and then stored in a non-transitory memory device 11a (FIG. 1) provided to the battery performance management server 11. The processor executive commands may allow a processor 11b (FIG. 1) included in the battery performance management server 11 to execute at least some of the steps described above. Alternatively, hardware logic circuits may be provided in the battery performance management server 11 to perform at least some of the steps described above in place of the processor executive commands. The hardware logic circuits may be ASIC (Application-Specific Integrated Circuit) or FPGA (Field-Programmable Gate Array). However, it will be obvious to those skilled in the art that the steps of the above embodiments may be executed not only by specific processor executive commands, specific hardware circuits, or a combination thereof, but also by other well-known software, hardware circuitry, or a combination thereof.

According to the present disclosure, since a big data-based artificial intelligence platform system linked with a plurality of charging stations is used to reliably evaluate the performance of the battery according to the driving history of the electric vehicle and the operation history of the battery and optimize the control factor used for controlling the charging/discharging of the battery, it is possible not only to extend the service life of the battery, but also to improve the safety.

By providing a highly reliable battery performance management service to an electric vehicle user, it is possible to induce replacement of the battery at an appropriate time point, as well as improve the reliability of a battery manufacturer.

By building a big data-based database with the battery performance evaluation information reflecting the driving tendency of the electric vehicle user, the database may be used as an accurate insurance premium calculation data for automobile insurance companies.

In the description of the various exemplary embodiments of the present disclosure, it should be understood that the elements referred to as 'server' are distinguished functionally rather than physically. Therefore, each element may be selectively integrated with other elements or each element may be divided into sub-elements for effective implementation control logic(s). However, it is obvious to those skilled in the art that, if functional identity can be acknowledged for the integrated or divided elements, the integrated or divided elements fall within the scope of the present disclosure.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery performance management system using an electric vehicle charging station, comprising:
   a battery performance management server communicatively connected through a network to a plurality of charging stations; and
   a database connected to the battery performance management server and configured to store (State Of Health) SOH information of electric vehicles,
   wherein, for an electric vehicle at a given charging station of the plurality of charging stations, the battery performance management server is configured to:
   collect, from the given charging station through the network, battery performance evaluation information of the electric vehicle, the battery performance evaluation information of the electric vehicle including:

identification information and operation characteristic accumulative information of a battery of the electric vehicle, identification information and driving characteristic accumulative information of the electric vehicle, and most recent charging characteristic information of the battery;

store the battery performance evaluation information of the electric vehicle in the database;

determine a current SOH of the battery corresponding to the collected battery performance evaluation information based on an artificial intelligence model that is trained at least in part using battery performance evaluation information of other vehicles, calculate an amount that the current SOH of the battery varies from a most recently determined SOH of the battery that is stored in the database, determine whether the calculated amount is greater than a predetermined reference value, in response to the calculated amount being greater than the predetermined reference value, update a control factor for controlling battery operation to a most recent control factor corresponding to the current SOH based on prestored correlation information in the database, and transmit the most recent control factor to a control system of the electric vehicle through the given charging station.

2. The battery performance management system according to claim 1, wherein the operation characteristic accumulative information of the battery includes at least one selected from the group consisting of accumulative operation time at each voltage section, accumulative operation time at each current section, and accumulative operation time at each temperature section.

3. The battery performance management system according to claim 1, wherein the driving characteristic accumulative information of the electric vehicle includes at least one selected from the group consisting of accumulative driving time at each speed section, accumulative driving time at each driving area, and accumulative driving time at each humidity section.

4. The battery performance management system according to claim 3, wherein the latest charging characteristic information includes at least one selected from the group consisting of SOC, voltage, current and temperature data of the battery measured or estimated at a plurality of time points.

5. The battery performance management system according to claim 1, wherein the most recent charging characteristic information includes at least one selected from the group consisting of SOC, voltage, current and temperature data of the battery measured or estimated at a plurality of time points.

6. The battery performance management system according to claim 1, wherein the artificial intelligence model is an artificial neural network.

7. The battery performance management system according to claim 1, wherein the battery performance management server is configured to transmit a driving distance of the electric vehicle, the current SOH and the identification information of the electric vehicle to an insurance company server.

8. The battery performance management system according to claim 1, further comprising an insurance company server, wherein the insurance company server is configured to calculate an insurance premium for the corresponding electric vehicle with reference to the identification information of the electric vehicle by using the current SOH and the driving distance of the electric vehicle.

9. A battery performance management system using an electric vehicle charging station, comprising:

a battery performance management server communicatively connected through a network to a plurality of charging stations; and a database connected to the battery performance management server and configured to store (State Of Health) SOH information of electric vehicles, wherein, for an electric vehicle at a given charging station of the plurality of charging stations, the battery performance management server is configured to:

collect, from the given charging station through the network, battery performance evaluation information of the electric vehicle, the battery performance evaluation information of the electric vehicle including:

identification information and operation characteristic accumulative information of a battery of the electric vehicle, identification information and driving characteristic accumulative information of the electric vehicle, and most recent charging characteristic information of the battery;

store the battery performance evaluation information of the electric vehicle in the database;

determine a current SOH of the battery corresponding to the collected battery performance evaluation information based on an artificial intelligence model that is trained at least in part using battery performance evaluation information of other vehicles, in response to the current SOH varying by a reference value or more compared to a most recently determined previous SOH, determine a most recent control factor for controlling battery operation, the most recent control factor corresponding to the current SOH based on prestored correlation information in the database, and transmit the most recent control factor to a control system of the electric vehicle through the given charging station, wherein the battery performance management server is configured to, in response to the battery performance evaluation information being received from the plurality of electric vehicle charging stations and the most recent charging characteristic information includes data sufficient to determine the current SOH of the battery:

determine the current SOH of the battery from the most recent charging characteristic information;

store a frequency distribution data generated from the operation characteristic accumulative information of the battery, a frequency distribution data generated from the driving characteristic accumulative information of the electric vehicle and the most recent charging characteristic information in the database as training input data of the artificial intelligence model; and store the current SOH of the battery in the database as training output data of the artificial intelligence model.

10. The battery performance management system according to claim 9,
wherein the battery performance management server is configured to repeatedly train the artificial intelligence model in response to an amount of training input data and training output data stored in the database exceeding a storage reference value.

11. The battery performance management system according to claim 9,
wherein the battery performance management server is configured to:
store the training input data and the training output data in the database to be matched with at least one of the identification information of the battery, the identification information of the electric vehicle, or a driving area of the electric vehicle; and
repeatedly train the artificial intelligence model to correspond to the at least one of the identification information of the battery, the identification information of the electric vehicle or the driving area of the electric vehicle in response to an amount of the stored training input data and training output data exceeding a storage reference value.

12. The battery performance management system according to claim 11,
wherein the battery performance management server is configured to determine the current SOH of the battery basis on an analysis of the battery performance evaluation information using the artificial intelligence model.

13. A battery performance management system using an electric vehicle charging station, comprising:
a battery performance management server communicatively connected through a network to a plurality of charging stations; and
a database connected to the battery performance management server and configured to store (State Of Health) SOH information of electric vehicles,
wherein, for an electric vehicle at a given charging station of the plurality of charging stations, the battery performance management server is configured to:
collect, from the given charging station through the network, battery performance evaluation information of the electric vehicle, the battery performance evaluation information of the electric vehicle including:
identification information and operation characteristic accumulative information of a battery of the electric vehicle,
identification information and driving characteristic accumulative information of the electric vehicle, and
most recent charging characteristic information of the battery;
store the battery performance evaluation information of the electric vehicle in the database;
determine a current SOH of the battery corresponding to the collected battery performance evaluation information based on an artificial intelligence model that is trained at least in part using battery performance evaluation information of other vehicles,
in response to the current SOH varying by a reference value or more compared to a most recently determined previous SOH, determine a most recent control factor for controlling battery operation, the most recent control factor corresponding to the current SOH based on prestored correlation information in the database, and
transmit the most recent control factor to a control system of the electric vehicle through the given charging station,
wherein the battery performance management server is configured to
receive the SOH information for each cycle of the battery and performance evaluation information of each cycle of the battery, wherein the performance evaluation information of each cycle of the battery includes operation characteristic accumulative information and most recent charging characteristic information measured in response to each charging/cycle of the battery; and
store the received SOH information and performance evaluation information of each cycle of the battery in the database, and
wherein the battery performance management server further includes an auxiliary artificial intelligence model trained using the received SOH information stored in the database and configured to output an auxiliary SOH output based on the operation characteristic accumulative information and the most recent charging characteristic information of the battery.

14. The battery performance management system according to claim 13,
wherein in response to the artificial intelligence model not being completely trained, the battery performance management server is configured to determine the current SOH based on the operation characteristic accumulative information and the most recent charging characteristic information of the battery included in the battery performance evaluation information using the auxiliary artificial intelligence model.

15. The battery performance management system according to claim 13,
wherein the battery performance management server is configured to:
determine the auxiliary SOH output based on the operation characteristic accumulative information and the most recent charging characteristic information of the battery included in the battery performance evaluation information using the auxiliary artificial intelligence model, and
determine the current SOH of the battery based on a weighted average of an SOH output determined by the artificial intelligence model and the auxiliary SOH output determined by the auxiliary artificial intelligence model.

16. The battery performance management system according to claim 15,
wherein the battery performance management server is configured to increase a weight endowed to the SOH output of the artificial intelligence model for calculating the weighted average as an amount of training of the artificial intelligence model increases.

17. A battery performance management system using an electric vehicle charging station, comprising:
a battery performance management server communicatively connected through a network to a plurality of charging stations; and
a database connected to the battery performance management server and configured to store (State Of Health) SOH information of electric vehicles, wherein, for an electric vehicle at a given charging station of the plurality of charging stations, the battery performance management server is configured to:

collect, from the given charging station through the network, battery performance evaluation information of the electric vehicle, the battery performance evaluation information of the electric vehicle including:
identification information and operation characteristic accumulative information of a battery of the electric vehicle,
identification information and driving characteristic accumulative information of the electric vehicle, and
most recent charging characteristic information of the battery;

store the battery performance evaluation information of the electric vehicle in the database;

determine a current SOH of the battery corresponding to the collected battery performance evaluation information based on an artificial intelligence model that is trained at least in part using battery performance evaluation information of other vehicles, in response to the current SOH varying by a reference value or more compared to a most recently determined previous SOH, determine a most recent control factor for controlling battery operation, the most recent control factor corresponding to the current SOH based on prestored correlation information in the database, and transmit the most recent control factor to a control system of the electric vehicle through the given charging station, wherein the control factor includes:

(a) at least one selected from the group consisting of: a charging current magnitude applied for each SOC section, a charging upper limit voltage value, a discharging lower limit voltage value, a maximum charging current, a maximum discharging current, a minimum charging current, a minimum discharging current, a maximum temperature, a minimum temperature, a power map of each SOC, and an internal resistance map of each SOC;

(b) at least one selected from the group consisting of: an upper limit of a pulse current duty ratio (a ratio of a pulse sustain period to a pulse rest period), a lower limit of the pulse current duty ratio, an upper limit of a pulse current duration, a lower limit of the pulse current duration, a maximum value of the pulse current, and a minimum value of the pulse current; or (c) at least one selected from the group consisting of a current magnitude in a constant-current charging (CC) mode, a cutoff voltage at which the constant-current charging (CC) mode ends, and a voltage magnitude in a constant-voltage charging (CV) mode.

18. A battery performance management method using an electric vehicle charging station, comprising:

collecting battery performance evaluation information including identification information and operation characteristic accumulative information of a battery included in an electric vehicle, identification information and driving characteristic accumulative information of the electric vehicle, and most recent charging characteristic information of the battery from a charging station through a network while the electric vehicle is being charged at the charging station;

storing the battery performance evaluation information in a database;

determining a current SOH corresponding to the collected battery performance evaluation information by using an artificial intelligence model that is trained at least in part using battery performance evaluation information of other vehicles;

calculating an amount that the current SOH of the battery varies from a most recently determined SOH of the battery that is stored in the database;

determining whether the calculated amount is greater than a predetermined reference value;

in response to the calculated amount being greater than the predetermined reference value, updating a control factor for controlling battery operation to a most recent control factor, the most recent control factor corresponding to the current SOH based on prestored correlation information in the database; and transmitting the most recent control factor to a control system of the electric vehicle through the charging station.

19. A computer device, comprising:

a non-transitory memory device configured to store a plurality of processor executive commands; and a processor configured to execute the plurality of processor executive commands, wherein by executing the processor executive commands, the processor is configured to:

(a) receive battery performance evaluation information including identification information and operation characteristic accumulative information of a battery included in an electric vehicle, identification information and driving characteristic accumulative information of the electric vehicle, and most recent charging characteristic information of the battery from a charging station through a network, (b) train an artificial intelligence model to output an SOH of the battery based on battery performance evaluation information of other vehicles, (c) determine a current SOH of the battery corresponding to the collected battery performance evaluation information using the trained artificial intelligence model, (d) read a previous SOH of the battery from a database, (e) calculate an amount that the current SOH of the battery varies from a most recently determined previous SOH of the battery, (f) determine whether the calculated amount is greater than a predetermined reference value, (g) in response to the calculated amount being greater than the predetermined reference value, update a control factor for controlling battery operation to a most recent control factor corresponding to the current SOH based on prestored correlation information in the database, and (h) transmit the most recent control factor to the charging station through the network.

* * * * *